(12) United States Patent
Ross et al.

(10) Patent No.: US 9,376,206 B2
(45) Date of Patent: Jun. 28, 2016

(54) TILTROTOR AIRCRAFT WITH INBOARD WING MOUNTED FIXED ENGINE ARRANGEMENT

(71) Applicant: Bell Helicopter Textron Inc., Fort Worth, TX (US)

(72) Inventors: Brent C. Ross, Flower Mound, TX (US); David R. Bockmiller, Fort Worth, TX (US); Mark L. Isaac, Fort Worth, TX (US); Brian J. Cox, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 122 days.

(21) Appl. No.: 13/797,350

(22) Filed: Mar. 12, 2013

(65) Prior Publication Data

US 2014/0263854 A1    Sep. 18, 2014

(51) Int. Cl.
*B64C 29/00* (2006.01)
*B64D 27/12* (2006.01)
*B64D 35/04* (2006.01)

(52) U.S. Cl.
CPC ............ *B64C 29/0033* (2013.01); *B64D 27/12* (2013.01); *B64D 35/04* (2013.01)

(58) Field of Classification Search
USPC .................................. 244/7 R, 7 C, 12.4, 56
See application file for complete search history.

(56) References Cited

U.S. PATENT DOCUMENTS

| | | | |
|---|---|---|---|
| 2,814,451 A * | 11/1957 | Turner et al. .................. | 244/7 R |
| 2,936,967 A * | 5/1960 | Dancik .......................... | 244/7 C |
| 2,936,968 A * | 5/1960 | Mazzitelli ..................... | 244/7 C |
| 3,065,929 A | 11/1962 | Holland | |
| 3,259,343 A * | 7/1966 | Roppel ......................... | 244/53 R |
| 3,284,027 A | 11/1966 | Marc | |
| 3,360,217 A * | 12/1967 | Trotter ......................... | 244/12.4 |
| 4,136,845 A * | 1/1979 | Eickmann ...................... | 244/54 |
| 4,142,697 A * | 3/1979 | Fradenburgh .................. | 244/7 R |
| 4,436,261 A | 3/1984 | Koleff | |
| 4,496,120 A * | 1/1985 | Eickmann ...................... | 244/56 |
| 4,783,023 A | 11/1988 | Jupe | |
| 5,085,315 A * | 2/1992 | Sambell ......................... | 244/7 R |
| 5,645,250 A * | 7/1997 | Gevers .......................... | 244/101 |
| 6,260,793 B1 | 7/2001 | Balayn et al. | |
| 6,276,633 B1 | 8/2001 | Balayn et al. | |
| 6,367,736 B1 * | 4/2002 | Pancotti ........................ | 244/7 R |

(Continued)

FOREIGN PATENT DOCUMENTS

| | | |
|---|---|---|
| DE | 3917499 | 12/1990 |
| EP | 2484587 A1 | 8/2012 |
| GB | 1461069 A | 1/1977 |

OTHER PUBLICATIONS

"Bell-X22A: Analysis of a VTOL research vehicle." Flight International, Mar. 23, 1967, p. 445-449.*

(Continued)

*Primary Examiner* — Joseph W Sanderson
(74) *Attorney, Agent, or Firm* — Fish & Richardson P.C.

(57) ABSTRACT

A rotor system for tilt rotor aircraft comprises an engine disposed at a first fixed position on a wing member, and a prop-rotor pylon mechanically coupled to the engine along a drive path extending through the wing member. The engine is disposed adjacent a fuselage of the tilt rotor aircraft, and the prop-rotor pylon is configured to selectively rotate between a vertical position and a horizontal position. The prop-rotor pylon is coupled to a plurality of rotor blades.

25 Claims, 16 Drawing Sheets

(56) References Cited

U.S. PATENT DOCUMENTS

| | | | |
|---|---|---|---|
| 6,843,447 B2* | 1/2005 | Morgan | 244/12.3 |
| 6,974,105 B2* | 12/2005 | Pham | 244/6 |
| 7,584,923 B2* | 9/2009 | Burrage | 244/7 R |
| 7,874,513 B1* | 1/2011 | Smith | 244/12.4 |
| 8,152,096 B2* | 4/2012 | Smith | 244/60 |
| 8,251,305 B2* | 8/2012 | Smith et al. | 244/7 C |
| 8,276,840 B2* | 10/2012 | Karem | 244/60 |
| 8,567,709 B2* | 10/2013 | Smith et al. | 244/7 C |
| 8,733,690 B2* | 5/2014 | Bevirt et al. | 244/12.4 |
| 2004/0038768 A1 | 2/2004 | Thomassey et al. | |
| 2005/0045762 A1* | 3/2005 | Pham | 244/7 R |
| 2007/0102573 A1* | 5/2007 | Goto | 244/76 R |
| 2007/0158494 A1* | 7/2007 | Burrage | 244/7 R |
| 2010/0276549 A1* | 11/2010 | Karem | 244/7 A |
| 2010/0327123 A1 | 12/2010 | Smith et al. | |
| 2011/0114797 A1* | 5/2011 | Karem | 244/7 A |
| 2012/0199699 A1 | 8/2012 | Isaac et al. | |
| 2014/0034781 A1 | 2/2014 | Kouros et al. | |

OTHER PUBLICATIONS

"Bell Boeing V-22 Osprey" Wikipedia, Mar. 10, 2012, available at: http://en.wikipedia.org/w/index.php?title=Bell_Boeing_V-22_Osprey&oldid=481213505.*

Niu, Michael C.Y. Airframe Structural Design: Practical Design Information and Data on Aircraft Structures. Hong Kong: Conmilit, 1988. Print.*

Wernicke, Kenneth, "USAAVLABS Technical Report 68-32, Tilt Prop-Rotor Composite Research Aircraft," U.S. Army Aviation Materiel Laboratories, Fort Eustis, Virgina, Nov. 1968, 490 pages.

Ross, Brent C., et al.; "Spindle Mounted Tiltrotor Pylon With Fixed Engine Arrangement;" U.S. Appl. No. 13/801,674, filed Mar. 13, 2013.

Foreign Communication From a Counterpart Application, Application No. 13167267.7, European Search Report dated Dec. 5, 2013, 4 pages.

Foreign Communication From a Counterpart Application, Application No. 13167267.7, Communication Pursuant to Article 94(3) EPC dated Dec. 19, 2013, 5 pages.

Communication Pursuant to Article 94(3) EPC issued in European Application No. 13167267.7 on Sep. 4, 2014, 4 pages.

Wernicke, Kenneth, "USAAVLABS Technical Report 68-32, Tilt Prop-Rotor Composite Research Aircraft" U.S. Army Aviation Material Laboratories, For Eustis, VA Nov. 1968, 490 pages.

European Search Report issued in European Application No. 13167268.5 on Sep. 29, 2014; 3 pages.

Communication Pursuant to Article 94(3) EPC issued in European Application No. 13167268.5 on Jan. 8, 2015; 6 pages.

Offfice Action issued in U.S. Appl. No. 13/801,674 on Jan. 9, 2015, 13 pages.

* cited by examiner

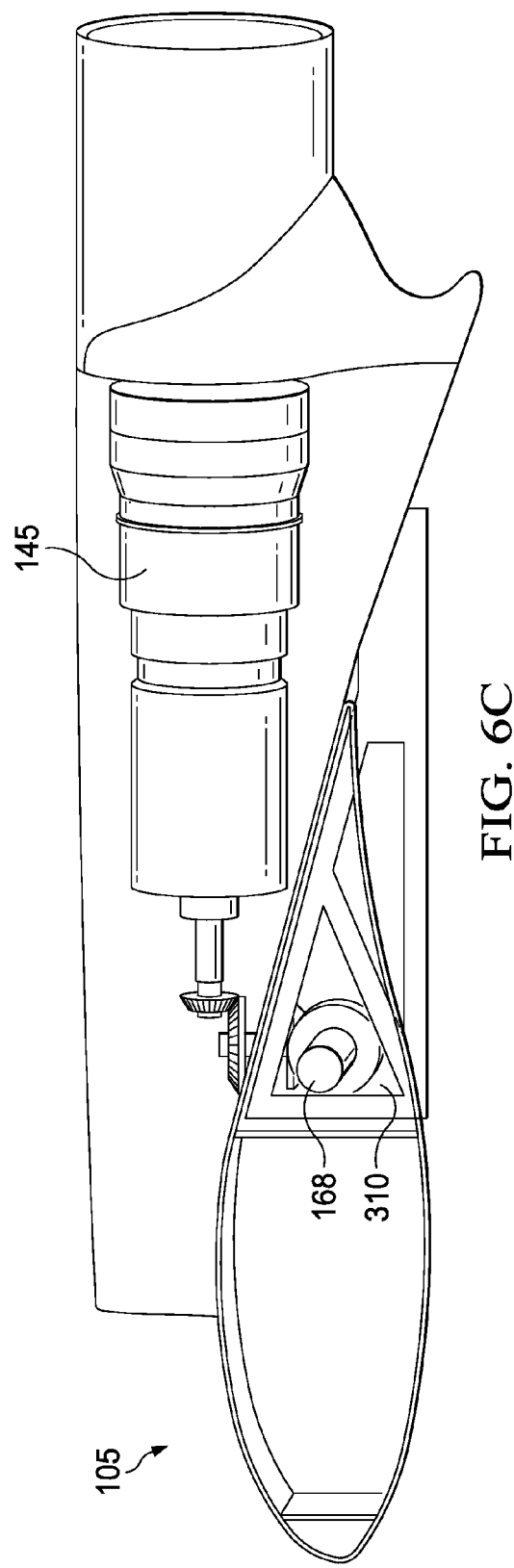

TILTROTOR AIRCRAFT WITH INBOARD WING MOUNTED FIXED ENGINE ARRANGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A tilt rotor aircraft can have wing mounted rotatable nacelles where the nacelles include an engine and rotor hub in a fixed position relative to each other. The nacelles can be selectively rotated between a helicopter mode and an airplane mode. In the helicopter mode, the nacelles can be rotated to an approximate vertical position so that the tilt rotor aircraft can hover similar to a conventional helicopter. In the airplane mode, the nacelles can be rotated to an approximate horizontal position so that the tilt rotor aircraft can fly similar to a fixed wing aircraft. Since the engine rotates along with the rotor hub, the engine must be capable of operating not only in a horizontal orientation, but also a vertical orientation. The ability to operate in a vertical orientation can limit the engine options available for use as well as increasing the certification, testing, and maintenance requirements for the available engines. Further, a rotating engine typically limits maintenance/inspection access around the engine to allow support of the rotating nacelle fairing and firewalls.

SUMMARY

In an embodiment, a rotor system for tilt rotor aircraft comprises an engine disposed at a first fixed position on a wing member, and a prop-rotor pylon mechanically coupled to the engine along a drive path extending through the wing member. The engine is disposed adjacent a fuselage of the tilt rotor aircraft, and the prop-rotor pylon is configured to selectively rotate between a vertical position and a horizontal position. The prop-rotor pylon is coupled to a plurality of rotor blades.

In an embodiment, a tilt rotor aircraft comprises a fuselage, a wing member rotatably coupled to the fuselage, an engine disposed at a first fixed position above the wing member, and a prop-rotor pylon mechanically coupled to the engine along a drive path. The engine is disposed adjacent the fuselage, and the prop-rotor pylon is configured to selectively rotate between a vertical position and a horizontal position.

In an embodiment, a tilt rotor aircraft comprises a fuselage, a wing member coupled to the fuselage, a plurality of engines located at fixed positions on the wing member, and a plurality of prop-rotor pylons rotatably coupled to the wing member. Each of the engines of the plurality of engines is disposed adjacent the fuselage, and each prop-rotor pylon is configured to selectively rotate between a vertical position and a horizontal position. Each of the prop-rotor pylons is mechanically coupled to at least one of the plurality of engines.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description:

FIG. 6C is still another plan, partial cut-away view of a drive path arrangement according to an embodiment.

DETAILED DESCRIPTION OF THE EMBODIMENTS

Figure 1:
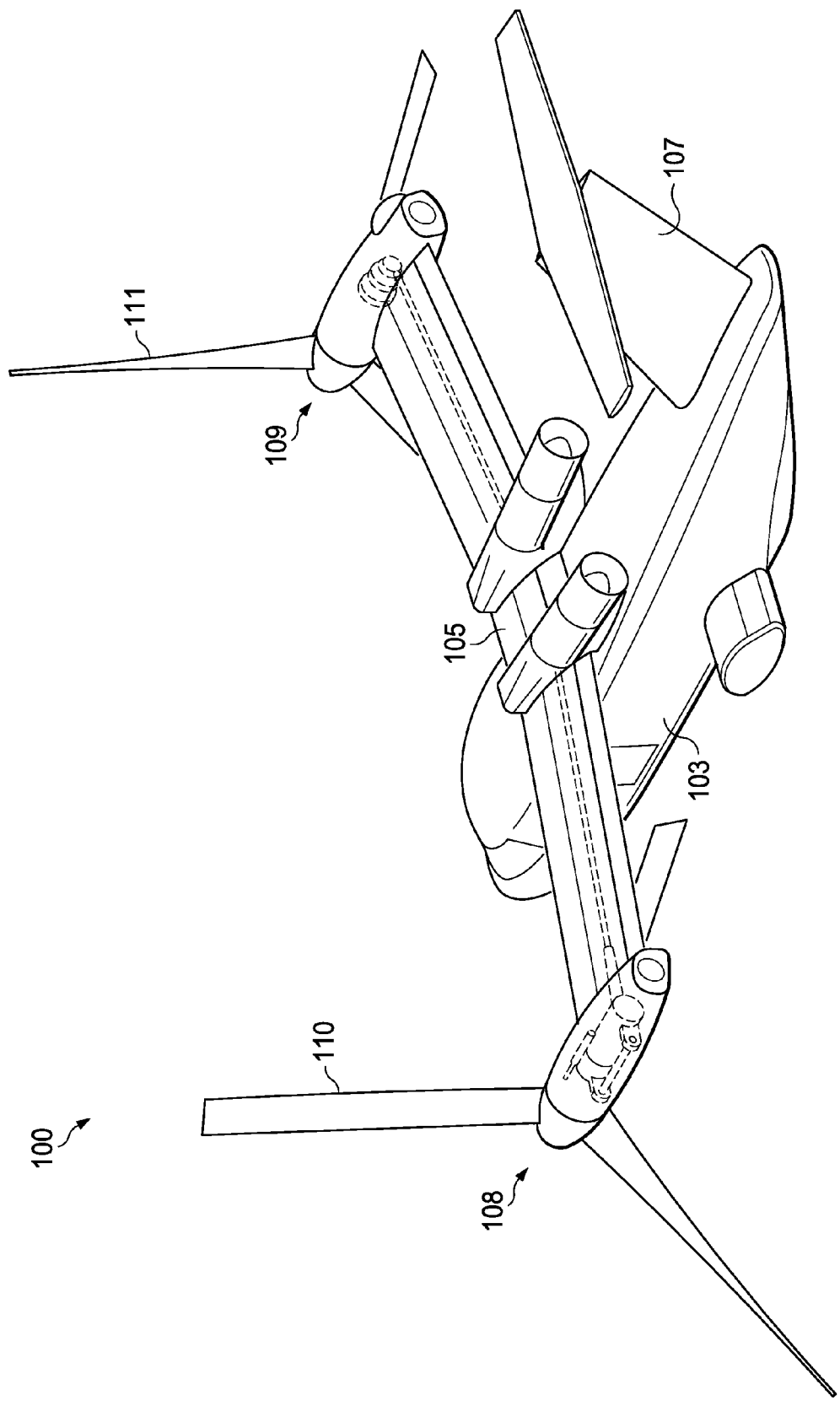
FIG. 1 is a perspective view of a tiltrotor aircraft according to an embodiment.

In the drawings and description that follow, like parts are typically marked throughout the specification and drawings with the same reference numerals, respectively. In addition, similar reference numerals can refer to similar components in different embodiments disclosed herein. The drawing figures are not necessarily to scale. Certain features of the invention can be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein can be employed separately or in any suitable combination to produce desired results. It should also be recognized that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Unless otherwise specified, use of the terms "connect," "engage," "couple," "attach," or any other like term describing an interaction between elements is not meant to limit the interaction to direct interaction between the elements and can also include indirect interaction between the elements described. In the specification, reference can be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein can be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein can be oriented in any desired direction.

The system of the present application includes an engine and pylon arrangement for a tilt rotor aircraft in which the engine is fixed in relation to a wing portion of the aircraft, while the pylon is rotatable relative to the wing member. The engine can be mounted on the wing adjacent to the fuselage of the aircraft, for example, above the wing member. The pylon supports a rotor hub having a plurality of rotor blades, and the prop-rotor pylon can be coupled to the engine by a drive shaft passing through the wing member. Rotation of the pylon allows the aircraft to selectively fly in a helicopter mode and an airplane mode, as well as at any position therebetween. The engine can be mechanically coupled to the prop-rotor pylon along a drive path. The drive path arrangement can be such that the axis of rotation of the prop-rotor pylon is aligned with an axis of rotation of a gearbox in the drive path. When the engine is mounted above the wing member, the wing member can be free to rotate relatively to the fuselage, which can be useful for storing the aircraft in a reduced amount of space.

Referring to FIG. 1, an example tilt rotor aircraft 100 is illustrated. The tilt rotor aircraft 100 comprises a fuselage 103, a wing member 105, and a tail member 107. While described as a single wing member 105, it is to be understood that the wing member can be formed from separate components such that two or more wing members are coupled to the fuselage 103 (e.g., each side of the fuselage can comprise a separate wing member). The aircraft 100 includes a first rotor system 108 and a second rotor system 109. The first rotor system 108 is located on an end portion of a first side of the wing member 105, while second rotor system 109 is located an end portion of a second side of the wing member 105. The first rotor system 108 and second rotor system 109 are substantially symmetric of each other about the fuselage 103. The first rotor system 108 and the second rotor system 109 each include a plurality of rotor blades 110 and 111 coupled to a rotor hub, respectively. In the interest of clarity, only the first rotor system 108 will be discussed in detail in the following description. However, it should be understood that the form and function of the second rotor system 109 can be fully understood from the description of the first rotor system 108 described herein. Also in the interest of clarity, the rotor blades 110 and 111 are omitted from some drawing views described below.

While FIG. 1 illustrates the rotor systems 108, 109 in the context of a tilt-rotor aircraft, it should be understood that the first rotor system 108 and the second rotor system 109 can be implemented on other tilt rotor aircraft. For example, an alternative embodiment can include a quad tilt rotor aircraft that has an additional wing member located aft of wing member 105, the additional wing member can have additional rotor systems similar to first rotor system 108 and the second rotor system 109. In some embodiments, the rotor systems 108, 109 can be used with an unmanned version of a tilt rotor aircraft 100. Further, the first rotor system 108 and/or the second rotor system 109 can be integrated into a variety of tilt rotor aircraft configurations.

Figure 2A:
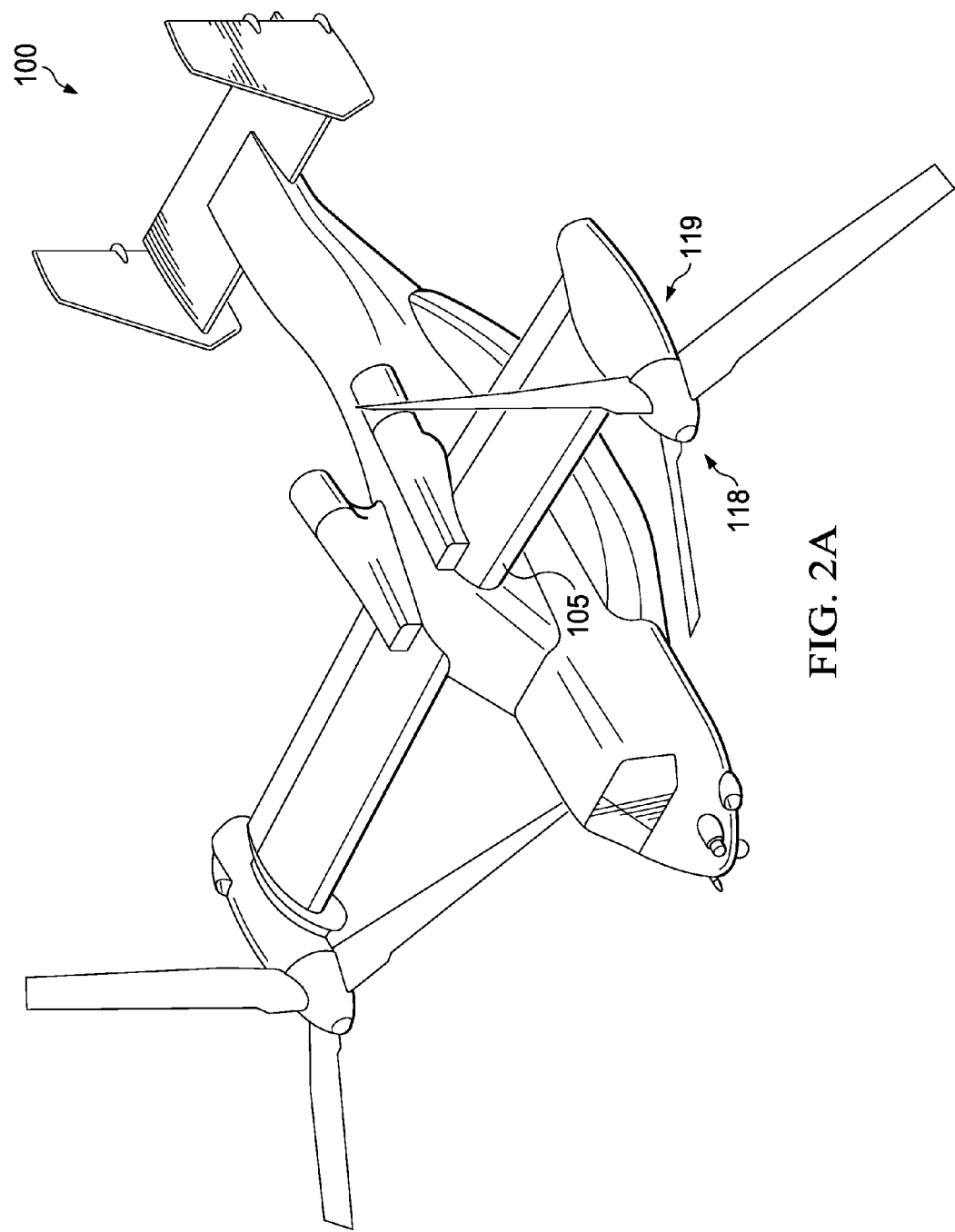
FIG. 2A is a perspective, partial cut-away view of a prop-rotor pylon in an airplane mode according to an embodiment.
Figure 2B:
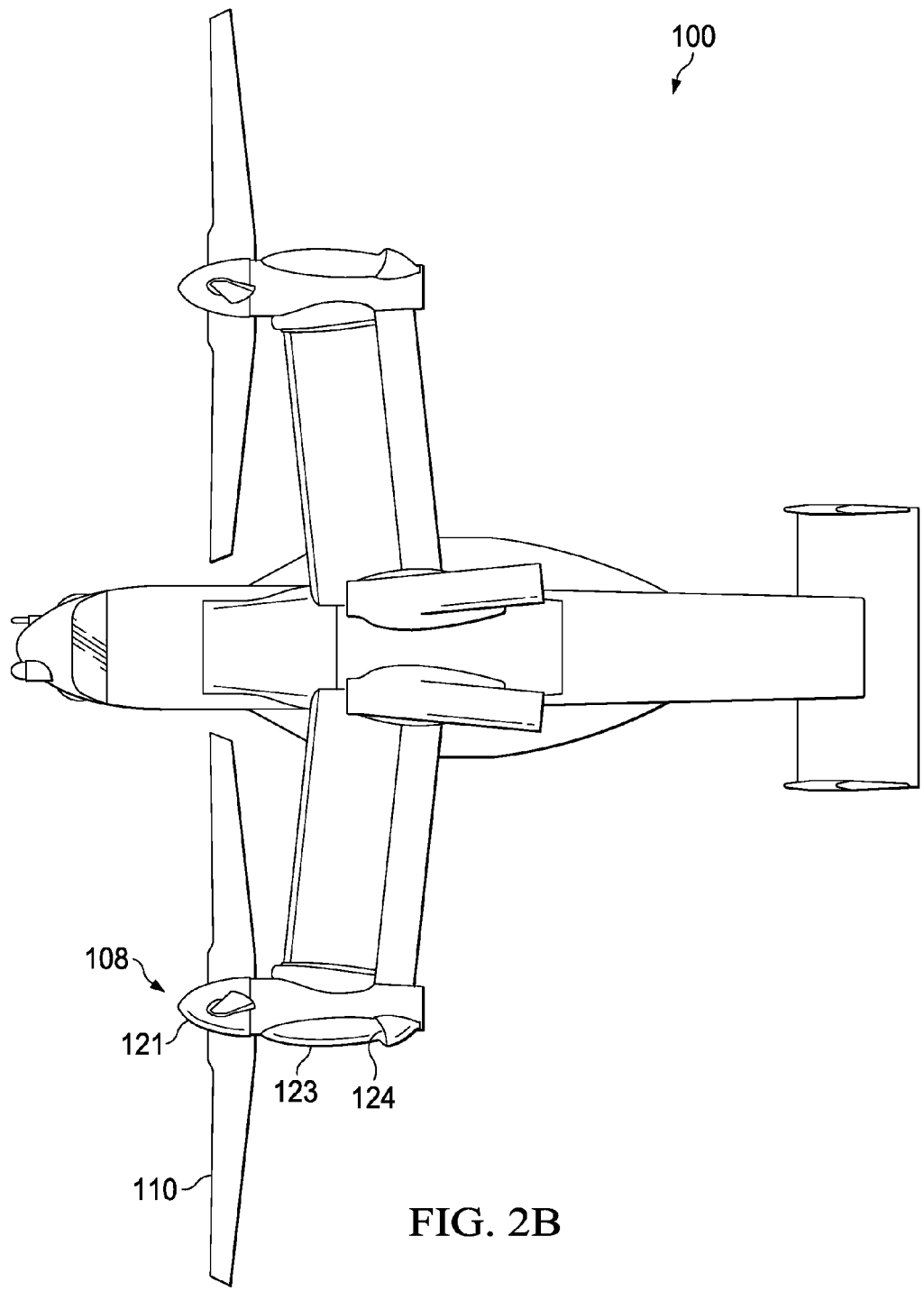
FIG. 2B is a plan, partial cut-away view of a prop-rotor pylon in an airplane mode according to an embodiment.
Figure 3A:
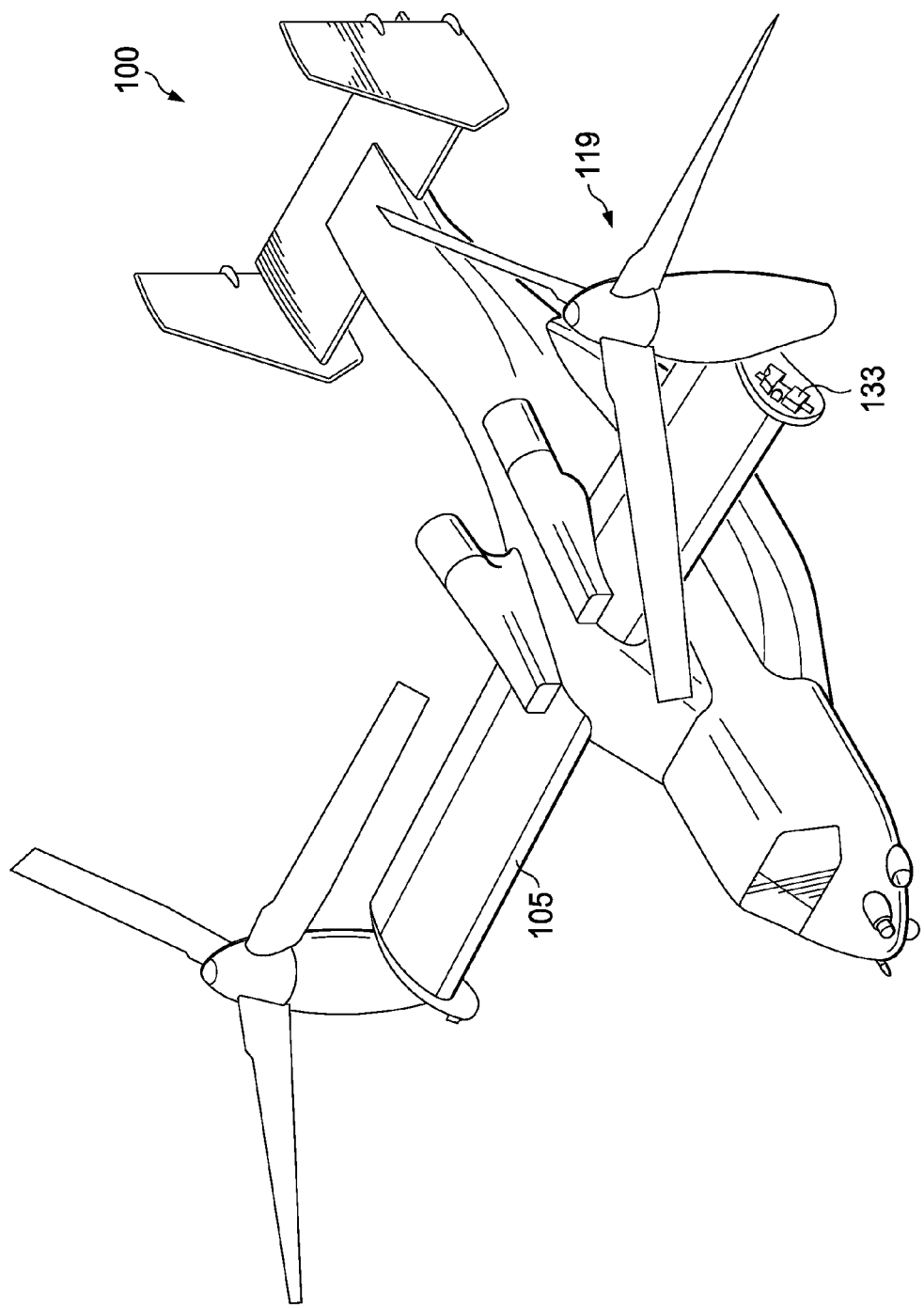
FIG. 3A is a perspective, partial cut-away view of a prop-rotor pylon in a helicopter mode according to an embodiment.
Figure 3B:
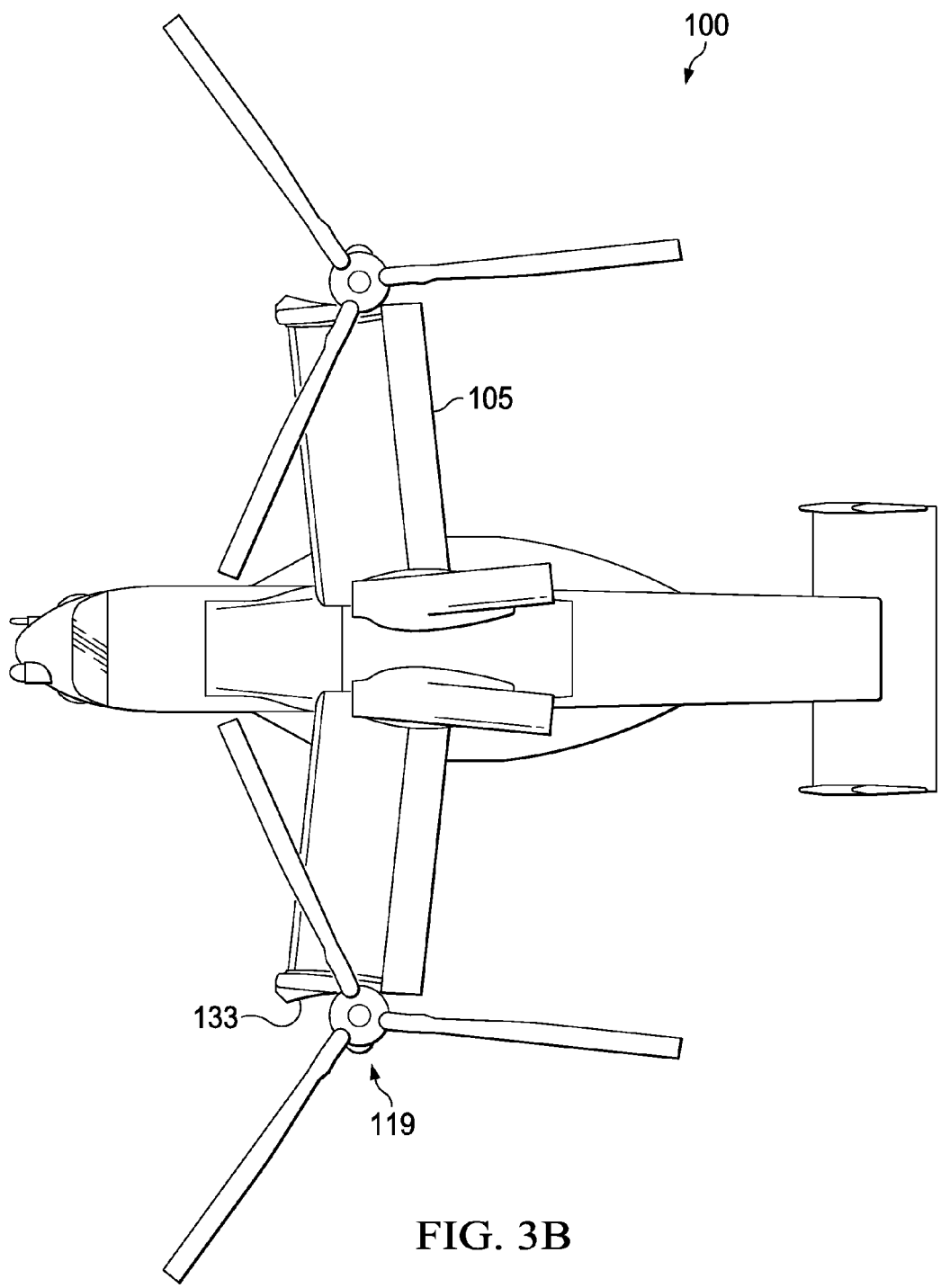
FIG. 3B is a plan, partial cut-away view of a prop-rotor pylon in a helicopter mode according to an embodiment.

In FIGS. 2A and 2B, the tilt rotor aircraft 100 and rotor system 108 are illustrated in an airplane mode, and in FIGS. 3A and 3B, the tilt rotor aircraft 100 and rotor system 108 are illustrated in a helicopter mode. The first rotor system 108 includes a prop-rotor pylon 119 located at an outboard position on the wing member 105. In the embodiment shown in FIGS. 2A and 2B, the prop-rotor pylon 119 is located at the tip of the wing member 105. The prop-rotor pylon 119 includes rotor mast coupled to a rotor hub, which in turn is coupled to the plurality of rotor blades (e.g., rotor blades 110 as shown in FIG. 1). The rotor mast and rotor hub form an internal rotor structure that can be located within an aerodynamic spinner fairing 121. The prop-rotor pylon 119 includes a pylon fairing or transmission fairing 123 that is configured to rotate along with the rotatable prop-rotor pylon 119 between the vertical and horizontal positions. One or more air inlets 124 can be included in the prop-rotor pylon 119 to provide for cooling or venting within the transmission fairing 123. For example, the air inlet 124 can be coupled with an air outlet at the aft end of the prop-rotor pylon 119 to provide an air flowpath for a fluid cooler (e.g., an aft oil cooler) located within the prop-rotor pylon 119.

The prop-rotor pylon 119 is rotatable between the airplane mode, in which prop-rotor pylon 119 is positioned approximately horizontal (as shown in FIGS. 2A and 2B), and a helicopter mode (as shown in FIGS. 3A and 3B), in which prop-rotor pylon 119 is positioned approximately vertical. In the airplane mode, vertical lift is primarily supplied by the airfoil profile of wing member 105, while the rotor blades 110, 111 in each prop-rotor pylon 119 provide forward thrust. In the helicopter mode, vertical lift and forward thrust is primarily supplied by the thrust of the rotor blades 110, 111 in each prop-rotor pylon 119. It should be appreciated that the tilt rotor aircraft 100 can be operated such that prop-rotor pylons 119 are selectively positioned at any position between the airplane mode and helicopter mode, which can be referred to as a conversion mode.

A conversion actuator 133 can be used to selectively rotate the prop-rotor pylon 119 between the vertical position (e.g., the helicopter mode) and the horizontal position (e.g., the airplane mode). The conversion actuator 133 can be coupled to the wing member 105 at a first point and the prop-rotor pylon 119 at a second point, thereby allowing the prop-rotor pylon 119 to be selectively rotated relative to the wing member 105. The conversion actuator 133 can comprise any of a variety of configurations with the exact actuator type being implementation specific. For example, the conversion actuator 133 can include, but is not limited to, a linear actuator, a rotary actuator, a hydraulic actuator, or the like. Multiple actuators can be provided to serve as redundant conversion actuation systems in the event that a first conversion actuator 133 is damaged, destroyed, or fails to operate as designed.

The rotor system can comprise a prop-rotor down-stop and/or a prop-rotor up-stop for engaging and retaining the prop-rotor in the airplane mode or helicopter mode, respectively. The down-stop and/or up-stop can be useful in retaining the prop-rotor pylon in position while relieving stresses on the rotational components and/or the actuator(s), such as the conversion actuator 133.

While illustrated as being located at the wing tip, it should be appreciated that the wing tip portion of wing member 105 can be lengthened to customize an aspect ratio of wing member 105 in accordance with implementation specific requirements (e.g., aerodynamic lift requirements). As such, it should be understood that even though the prop-rotor pylon 119 is illustrated approximately abutting the wing tip portion of wing member 105, in some embodiments, the prop-rotor pylon 119 can include the wing tip portion extending beyond the prop-rotor pylon 119.

The prop-rotor pylon 119 can be rotatably coupled to the wing member 105 using any suitable configuration. In the embodiment shown in FIG. 4, the prop-rotor pylon 119 is mounted on and rotates about a spindle 155. The spindle 155 can generally comprise a support element that is rotatably coupled to the wing member 105 and configured to allow the prop-rotor pylon 119 to selectively rotate between the helicopter mode and the airplane mode. For example, the spindle 155 is disposed through and engages the ribs 151, 153, which can comprise rotational bearings 152, 154. The bearings 152, 154 can generally be configured to allow the spindle to rotate with the prop-rotor pylon 119 in response to an actuation force provided by the conversion actuator 133. The spindle 155 can be coupled to the wing member 105 through the ribs 151, 153 on a single side of the prop-rotor pylon 119 such that the prop-rotor pylon 119 is not disposed between two adjacent ribs and/or does not engage ribs on both sides of the prop-rotor pylon 119. This configuration can allow the prop-rotor pylon 119 to be located at the tip of the wing member 105 without requiring any additional ribs or support beams (e.g., wing spars, etc.) disposed outboard of the prop-rotor pylon 119.

While illustrated as being mounted on the spindle 155, the prop-rotor pylon 119 can be rotatingly coupled to the wing member 105 using additional configurations. In an embodiment, the prop-rotor pylon 119 can comprise a plurality of trunnions extending from a housing within the prop-rotor pylon. The trunnions can engage rotational bearings in adjacent rib members on either side of the prop-rotor pylon 119 to allow the prop-rotor pylon 119 to rotate between the helicopter mode and airplane mode about the axis of the trunnions. Such an embodiment can be useful with the prop-rotor pylon is disposed along the wing member 105 rather than at the tip of the wing member 105.

Figure 4:
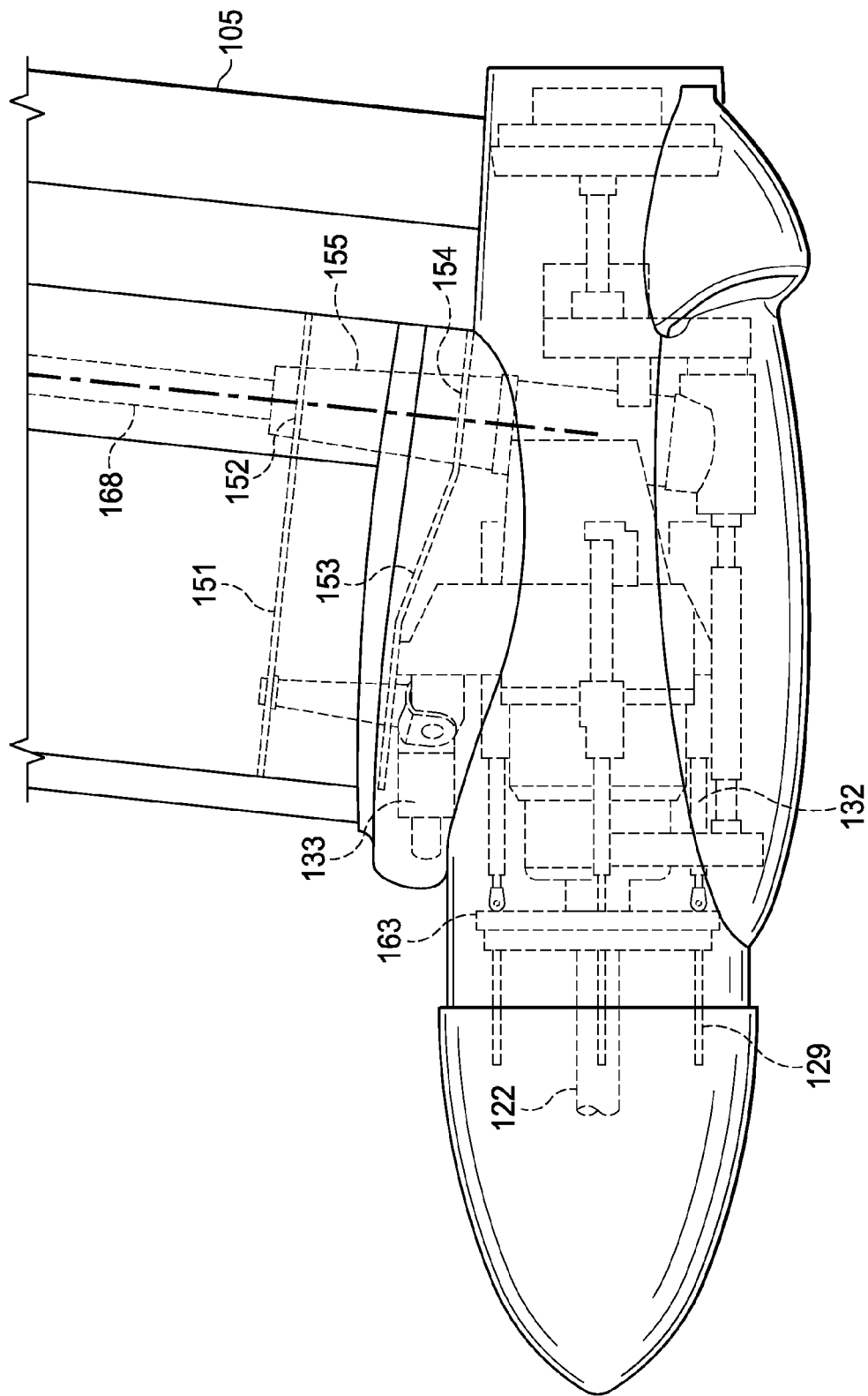
FIG. 4 is a plan, partial cut-away view of a spindle mounting for a prop-rotor pylon in an airplane mode according to an embodiment.

The rotor blades coupled to the prop-rotor hub and prop-rotor mast 122 can be operated using any available control system. As shown in FIG. 4, the rotor system 108 is operated and controlled using a swashplate 162 coupled to one or more actuators 132 to allow the prop-rotor system 108 to operate in airplane mode or helicopter mode. The swashplate 162 can be coupled to the rotor blades via a plurality of pitch links 129. A plurality of swashplate actuators 132 are configured to selectively actuate the swashplate 162, thereby selectively changing the pitch of the rotor blades 110 so as to affect thrust, lift, and direction of the aircraft 100 during operation. For example, the swashplate 162 can be selectively tilted to effect a cyclic pitch change of the rotor blades 110 such as during the helicopter mode. In addition, the swashplate 162 can be linearly actuated to effect a collective pitch change of the rotor blades 110 such as during airplane mode. The control system actuators can be located on the prop-rotor pylon 119 and rotate with the prop-rotor pylon 119 between the helicopter mode and the airplane mode during use.

Figure 5A:
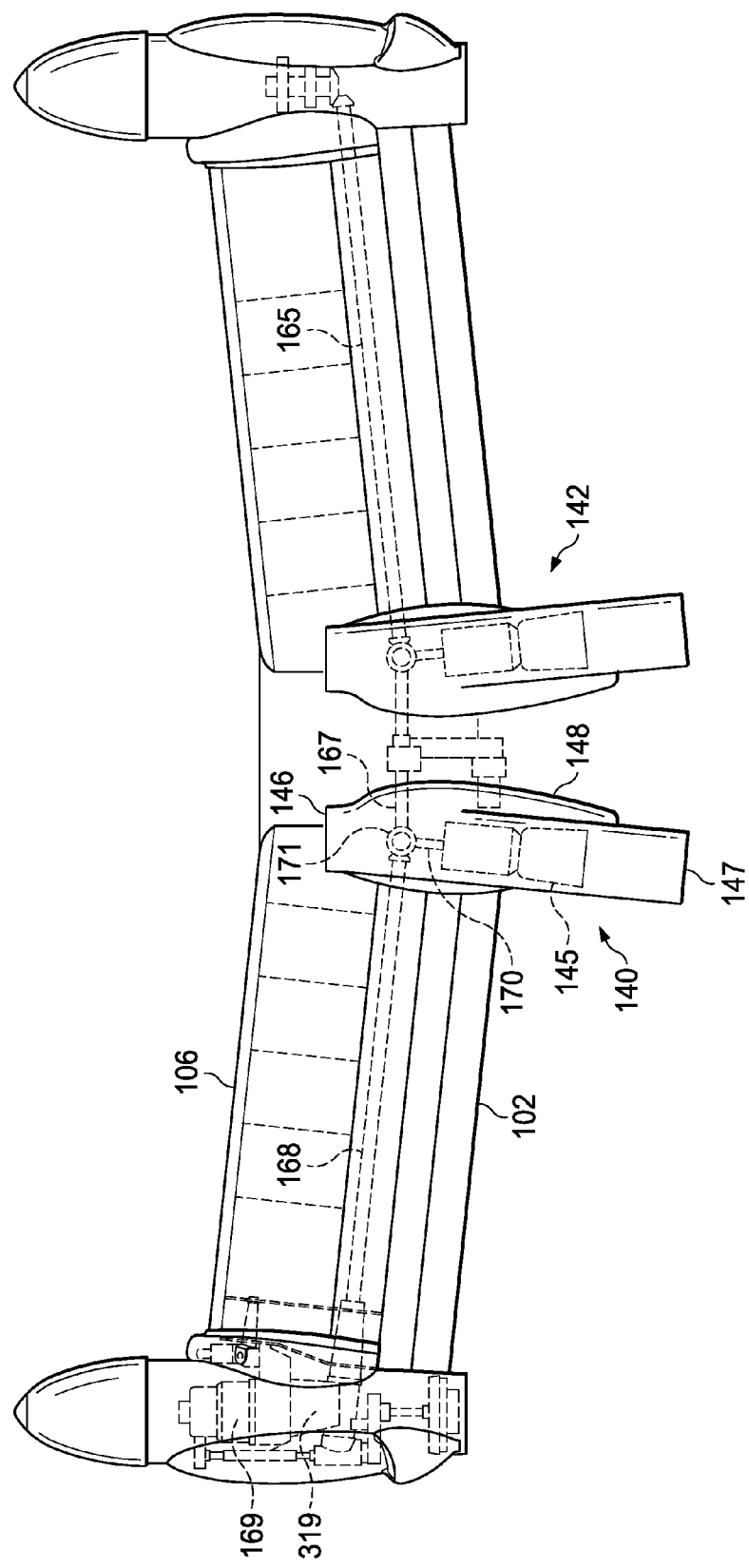
FIG. 5A is a schematic view of a drive path arrangement according to an embodiment.

Referring to FIG. 5A, the engine system 140 includes an engine 145 located within an engine nacelle 148. An air inlet 146 provides an inlet point for air into the engine 145 and an exhaust outlet 147 allows the air and combustion products from the engine 145 to exit the engine nacelle 148. The aircraft 100 includes a first engine system 140 and a second engine system 142. The first engine system 140 is located on the wing member 105 adjacent the fuselage on a first side, while second engine system 142 is located on the wing member 105 adjacent the fuselage on a second side. The first engine system 140 and second engine system 142 can be substantially symmetric of each other about the fuselage 103. In the interest of clarity, only the first engine system 140 is discussed below. However, it should be understood that the form and function of the second engine system 142 can be fully understood from the description of the first engine system 140 described herein.

The engine system 140 is disposed at a first fixed position on the wing member 105 adjacent the fuselage (e.g., fuselage 103 of FIG. 1). As used herein, the term "adjacent the fuselage" refers to a positioning of the engine system 140 within a distance of about one width of the fuselage from the fuselage, and in some embodiments, can refer to a position of the engine system 140 at least partially overlapping with the fuselage when the aircraft is viewed from above. For example, the engine system 140 can be located at a position and aligned to allow a drive shaft 170 from the engine 145 to engage a drive shaft coupling or gearbox between an interconnect drive shaft 167 and the drive shaft 168 passing to the prop-rotor pylon 119. Due to the optional forward sweep of the wing member 105, which is not necessary for the more general embodiment, and/or to allow flexibility for wing bending under load, the drive shaft system passing through the wing member 105 can comprise a plurality of sections (e.g., the drive shaft 168, the interconnect drive shaft 167, and the drive shaft 165). These sections can be used to allow the drive shaft angle to change between the interconnect drive shaft 167 passing through the fuselage and the drive shafts 165, 168 passing through the wing member 105. The coupling of the engine 145 to the drive shaft system can then occur by positioning the engine 145 so that the drive shaft 170 from the engine is mechanically coupled the drive shaft coupling or gearbox.

The engine system 140 can be located above the wing member 105 and adjacent the fuselage in a fixed position. In this configuration, the air inlet 146 can be positioned on top of the wing at any location between the leading edge 106 of the wing member 105 and the trailing edge 102 of the wing member 105. In general, the air inlet 146 can be positioned on the front half of the wing member 105 to allow the engine 145 to be positioned in-line with the air inlet 146 and at least partially over the wing member 105. When the engine system 140 is disposed above the wing member 105, the wing member 105 can be rotatably coupled to the fuselage, as described in more detail herein. Alternatively, the engine system 140 and/or the air inlet 146 can be positioned in-line or below the wing member 105 adjacent the fuselage. In this configuration, the engine system 140 can be fixedly coupled to the wing member 105 and not the fuselage. In some embodiments the air inlet 146 can be located in front of the leading edge 106 of the wing member 105. The exact position of engine system 140 and/or the air inlet 146 is implementation specific and can depend, at least in part, upon the aerodynamic ram air effects that can be achieved through selective placement and/or any frontal surface air drag effects for the aircraft.

The engine system 140 including the engine 145, the engine nacelle 148, and the air inlet 146 can be oriented in a number of positions relative to the wing member 105 and fuselage. For example, the engine system 140 can be oriented in the freestream direction, thereby reducing or minimizing the cross-sectional area of the engine system 140 within the flow stream. This orientation can result in the engine system 140 be approximately aligned along the longitudinal axis of the fuselage, though some amount of cant from this alignment can result depending on the design of the fuselage, wing member, and engine nacelle.

In some embodiments, the engine system 140 is canted such that the exhaust outlet 147 angles outboard (i.e., away) from the fuselage. For example, the engine system 140 can be aligned approximately perpendicular to the wing sweep, which as illustrated in FIG. 5A can be a forward wing sweep (i.e., the wing member angles forward from the wing root). This configuration can be advantageous in directing the exhaust away from the fuselage, which can reduce fuselage heating from the engine exhaust. This configuration can also provide an improved turbine burst capability from the engine systems 140, 142 by angling any turbine burst cones in the engines away from each other.

Figure 5B:
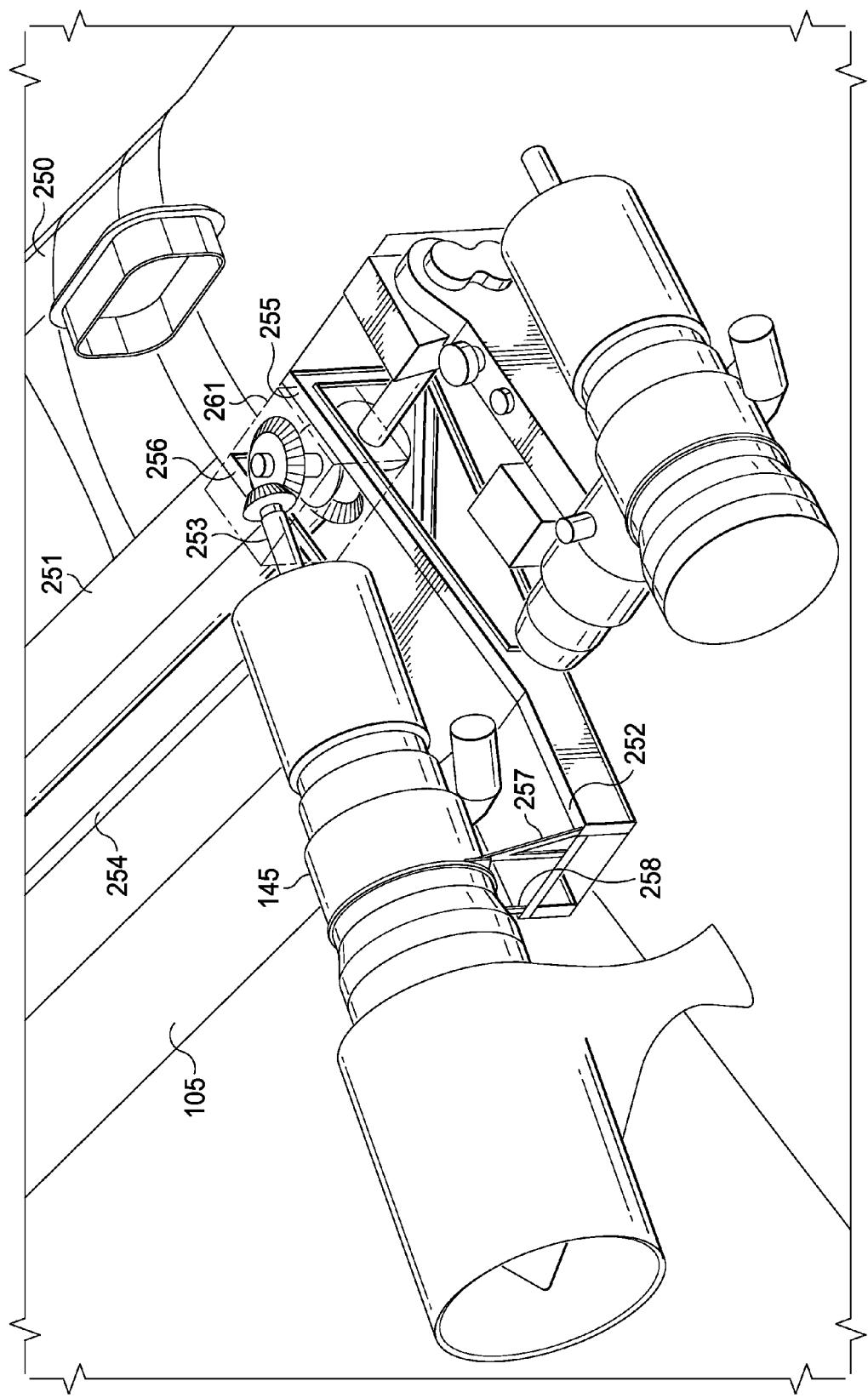
FIG. 5B is a perspective, partial cut-away view of an engine arrangement and mounting according to an embodiment.

An engine support structure can be used to mount the engine 145 to the wing member 105. The engine 145 can be mounted to the wing member 105 using any suitable structure capable of fixedly retaining the engine 145 and the remaining portions of the engine system 140 in position on the wing member 105. As illustrated in FIG. 5B, the engine 145 can be mounted on the wing member 105 using a torque box 252. The torque box 252 is formed on each side by ribs 255, 256 extending from the aft spar 251 and aft cove spar 254 under the engine 145. The ribs 255, 256 can extend to the front spar 250 to better support the cantilevered loads from the engine 145 on the torque box 252. The ribs 255, 256 can extend aft of the trailing edge 102 of the wing member 105 to support the engine 145 depending on the specific mounting location of the engine 145. One or more cross members can extend between the ribs 255, 256 to provide lateral support as needed. The engine 145 can be coupled to the torque box 252 through a plurality of mechanical couplings. In the example shown in FIG. 5B, one or more lateral and/or vertical links 257, 258 couple the engine 145 at a mid-mount location to the torque box 252. At the forward end of the engine 145, the engine 145 can be coupled to a gearbox 261 using a torque tube 253, and the gearbox 261 can be coupled to the aft spar 251 to support the load on the gearbox 261 and engine 145. One or more additional lateral and/or vertical links can be used as appropriate to support the engine 145.

In an embodiment in which the engine 145 is mounted in-line or below the wing member 105, the engine 145 can be coupled to a torque box 252 from below using one or more links. The links can be coupled to any point on the torque box 252 to allow the engine 145 to be supported in the desired position. A torque tube 253 can also be used to couple the engine 145 to the gearbox 261, and thereby the wing member 105. In some embodiments, a support frame can be coupled to the torque box 253, and the engine 145 can be mounted within the support frame. Further, the air inlet 146 can be mounted above or below the wing member 105. When the air inlet 146 is positioned below the wing member 105, the air inlet 146 can be coupled to the wing member 105, the torque box 252, and/or any support frame, if present.

Figure 6A:
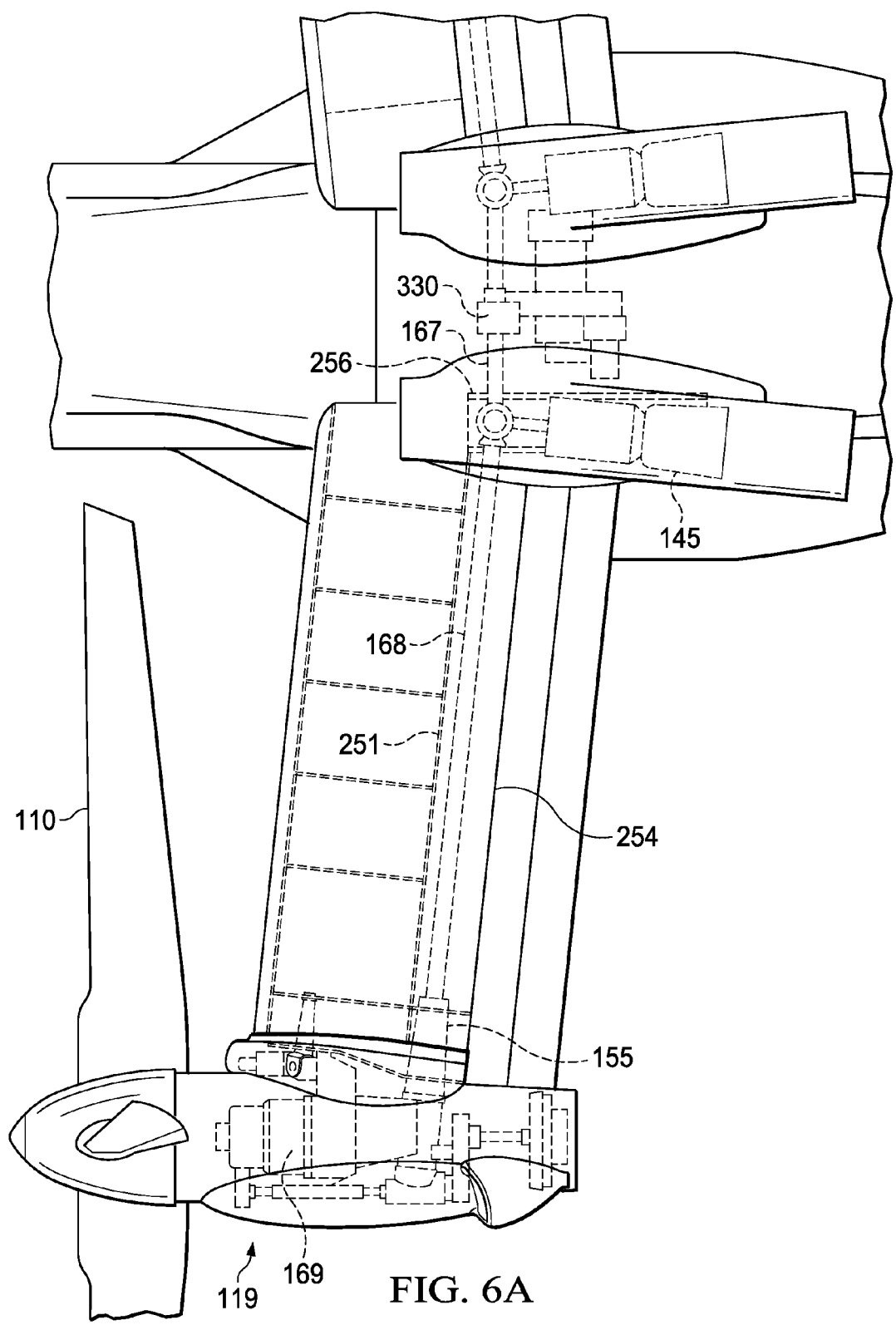
FIG. 6A is a plan, partial cut-away view of a drive path arrangement according to an embodiment.

The engine 145 disposed on the wing member 105 is mechanically coupled to the prop-rotor pylon 119 along a drive path extending through the wing member 105. The drive path provides a transfer of torque from the engine 145 to the rotor mast. An embodiment of a drive system and drive path is illustrated in FIG. 6A. In this embodiment, the drive path between the engine 145 and the prop-rotor pylon 119 begins with power from the engine 145 being transferred through the engine drive shaft 170 to the gearbox 261. Within the gearbox 261, power is transferred to a drive shaft 168 and an interconnect drive shaft 167. The drive shaft 168 passes through the wing member 105. For example, the drive shaft 168 can pass between the aft spar 251 and the aft cove spar 254 through a plurality of ribs to extent to the prop-rotor pylon 119. At the prop-rotor pylon 119, the drive shaft 168 can be coupled to a gearbox configured to provide power to the prop-rotor gearbox 169, which can reduce the rotational speed of the drive shaft 168 to a speed useful with the rotor hub and rotor blades 110.

Power transferred to the interconnect drive shaft 167 can pass to another gearbox associated with a second engine and prop-rotor pylon. In an engine out condition (e.g., an engine associated with the second prop-rotor pylon), power can be conveyed from an operable engine (e.g., engine 145), through the gearbox 261, to the interconnect drive shaft 167, through a second gearbox and along a second drive shaft to the second prop-rotor pylon to allow the second prop-rotor pylon to operate.

Figure 6B:
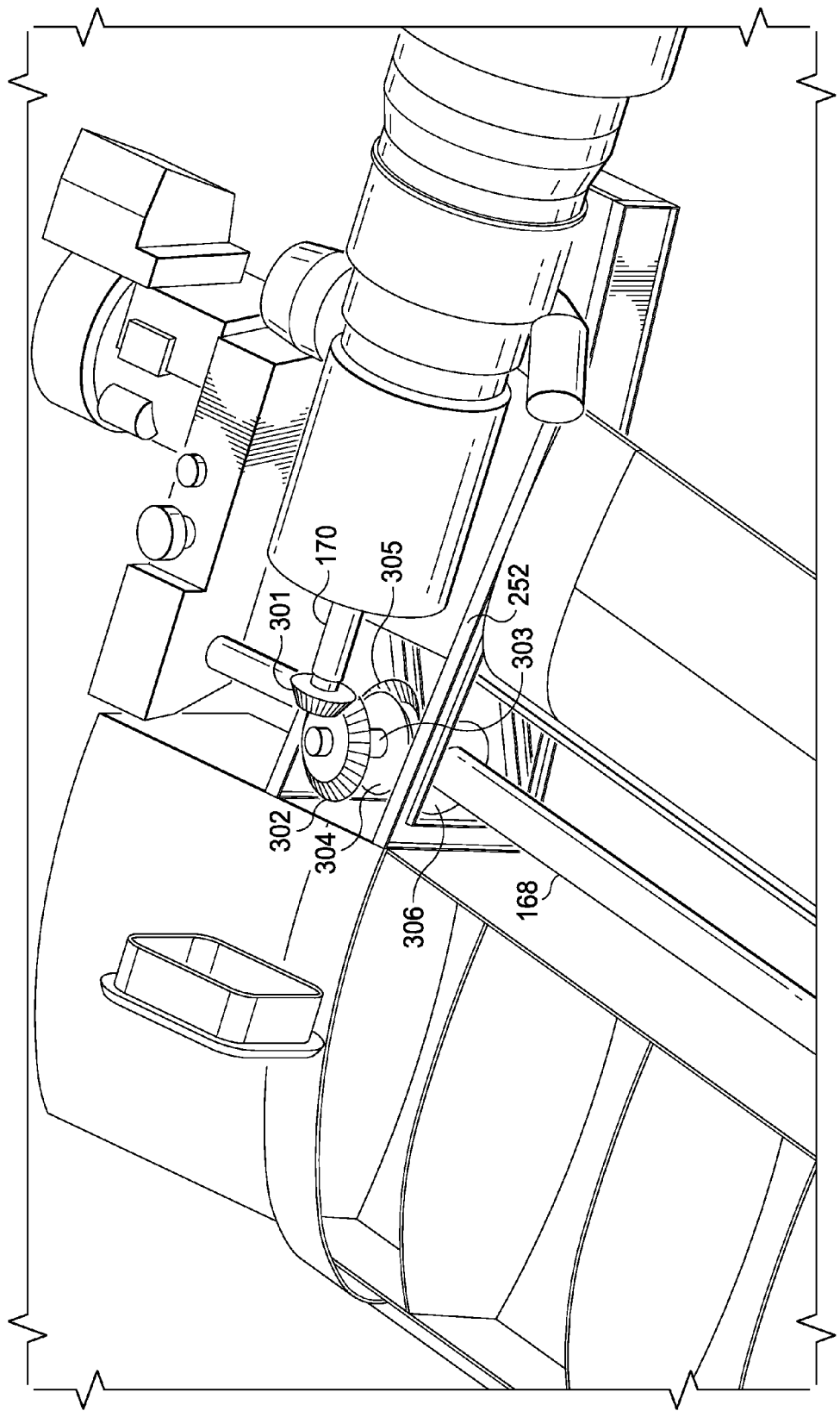
FIG. 6B is another perspective, partial cut-away view of a drive path arrangement according to an embodiment.

The gearbox 261 is shown in more detail in FIG. 6B. As illustrated, the engine drive shaft 170 is coupled to a conical input gear 301, which engages a conical output gear 302. The conical output gear 302 is coupled to a shaft 303, which is coupled to a second conical input gear 304. The second conical input gear 304 can be coupled with two output gears including an interconnect drive shaft gear 305 and a drive shaft output gear 306. The conical input gears 301, 304 and/or conical output gears 302, 305, 306 can have straight teeth or helical teeth (e.g., helical gears). In an embodiment, the conical input gears 301, 304 and the conical output gears 302, 305, 306 can form a spiral bevel gearset.

As illustrated in FIGS. 6B and 6C, the shaft 303 allows the first conical input gear 301 and the conical output gear 302 to transfer power to the second conical input gear 304 and conical output gears 305, 306 when the engine is located above the wing member 105. The drive shaft output gear 306 is coupled to the drive shaft 168, which can be aligned with a channel 310 passing through one or more ribs within the wing member 105. The drive shaft 168 can be supported at one or more points along its length within the wing member 105, and the supports can provide dampening and/or retain the drive shaft 168 within the channel 310. The drive shaft 168 then passes to a gearbox on the prop-rotor pylon 119 to provide power to the rotor mast.

Figure 6D:
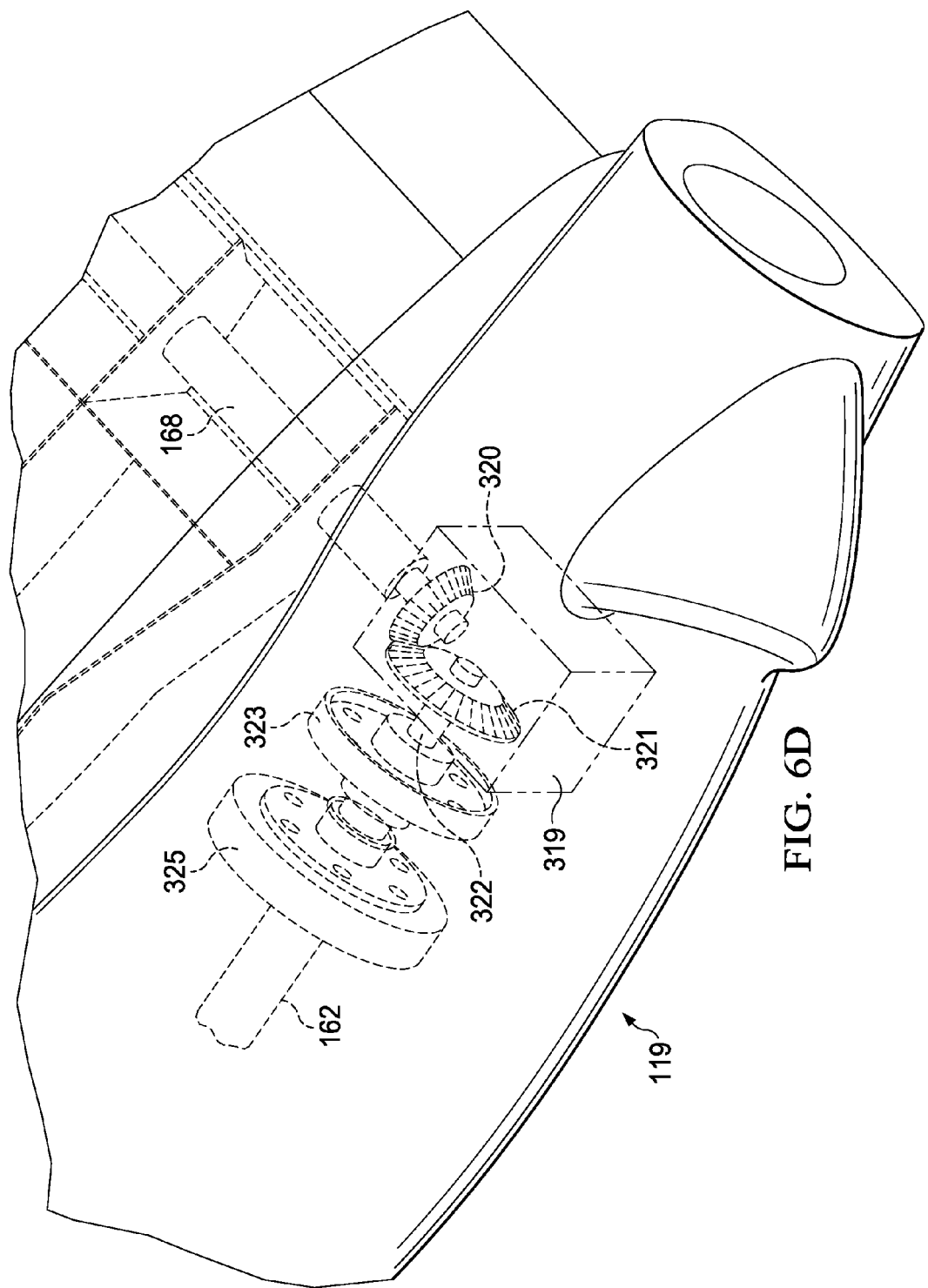
FIG. 6D is yet another perspective, partial cut-away view of a drive path arrangement according to an embodiment.

As shown in FIGS. 6A and 6D, the drive shaft 168 is coupled to a gearbox 319 disposed on the inboard side of the prop-rotor pylon 119. The prop-rotor pylon 119 can rotate about a rotational axis of the spindle 155. In order to allow torque to be transferred to the rotor mast 122 as the prop-rotor pylon 119 selectively rotates, a rotational axis of the gearbox 319 can be aligned with the rotational axis of the spindle 155. In order to allow the gearbox 319 to be located co-axially within the spindle 155, the drive shaft 168 can pass through the center of the spindle 155, and the gearbox 319 can be located in-line with the spindle 155. In an embodiment, the gearbox 319 is disposed within the spindle 155 and within the prop-rotor gearbox 169 to maintain the alignment of the rotational axis of the gearbox 319 with the rotational axis of the spindle 155 as the prop-rotor pylon 119 rotates.

Within the gearbox 319, the drive shaft 168 is coupled to a conical input gear 320 which engages a conical output gear 321. The conical input gear 320 and/or the conical output gear 321 can have straight or helical teeth. In an embodiment, the input gear 320 and the output gear 321 form a spiral bevel gearset having an axis of rotation aligned with the longitudinal axis of the drive shaft 168. The axis of rotation of the drive shaft 168 can align with the axis of rotation of the spindle 155. This alignment can allow the prop-rotor pylon 119 to rotate about the axis of rotation of the spindle 155 while maintaining a mechanical coupling through the gearbox 319 and the gearbox 261.

The conical output gear 321 can be coupled to a shaft 322 which can pass to one or more reduction gear stages within the prop-rotor gearbox 169. In general, the reduction gear stage or stages are configured to convert the torque from the engine 145 to a reduced speed suitable for the prop-rotor mast 122. The prop-rotor gearbox 169 can comprise various reduction gearing configurations such as one or more planetary gearsets, one or more helical gearsets, or the like arranged in one or more speed reduction stages and mechanically coupled to the prop-rotor mast 122.

In an embodiment illustrated in FIG. 6D, the prop-rotor gearbox 169 comprises a plurality of planetary gear reduction stages. In this embodiment, the inputs from the engine 145 can be transferred by the drive shaft 168 and through the gearbox 319 to the reduction gearsets 323, 325. In this embodiment, the shaft 322 can be coupled to two stages of reduction provided by two planetary gearsets 323, 325, which can be coaxial with each other and/or the conical output gear 321. The first planetary gearset 323 can comprise an intermediate reduction stage for accepting a high speed input from the conical gear 321 and reducing the speed to the second planetary gearset 325. The second planetary gearset 325 can comprise a final reduction stage to reduce the input speed to a suitable speed for the prop-rotor mast 122. The prop-rotor mast 122 can then be coupled to the rotor hub and the plurality of rotor blades for use in operating the aircraft. Various additional combinations of cylindrical gears (e.g., helical gearsets), planetary gears, and the like can be used to reduce the input speed from the engine 145 and/or the drive shaft 168 to a suitable speed for the prop-rotor mast 122.

One or more accessory input drives can be optionally coupled to the drive path. The accessory input drives can be used to drive auxiliary equipment such as one or more pumps (e.g., a hydraulic pump, a coolant pump, etc.), blowers, electrical generators, and the like. Each accessory input drive can be located and mesh with a gear at a suitable location in the drive path to provide the appropriate input speed to the accessory, while also taking into account space considerations along the drive path. The accessory input drives can be located in the engine system 140, the prop-rotor gearbox 169, or at another gearbox location along the drive path. As illustrated in FIG. 6A, a midwing gearbox 330 can comprise one or more gears that mesh with one or more gears associated with the interconnect drive shaft 167. The power provided the interconnect drive shaft 167 can drive one or more accessory input drives located within the midwing gearbox 330.

As described herein, the engine system 140 can be mounted above the wing member 105. As shown in FIGS. 7A, 7B, 7C, and 7D, mounting the engine system 140 above the wing member 105 can allow the wing member 105 to rotate relative to the fuselage 103. As illustrated, the engine assembly 140 can be disposed above the wing member 105 such that the wing member 105 does not have any structures on the lower side to interfere with rotating the wing member 105 into alignment with the fuselage (e.g., as illustrated in FIG. 7D). The wing member 105 can rotate as a single unit or in component portions. Once in the rotated position, the width of the aircraft 100 can be reduced relative to the operational configuration.

Figure 7A:
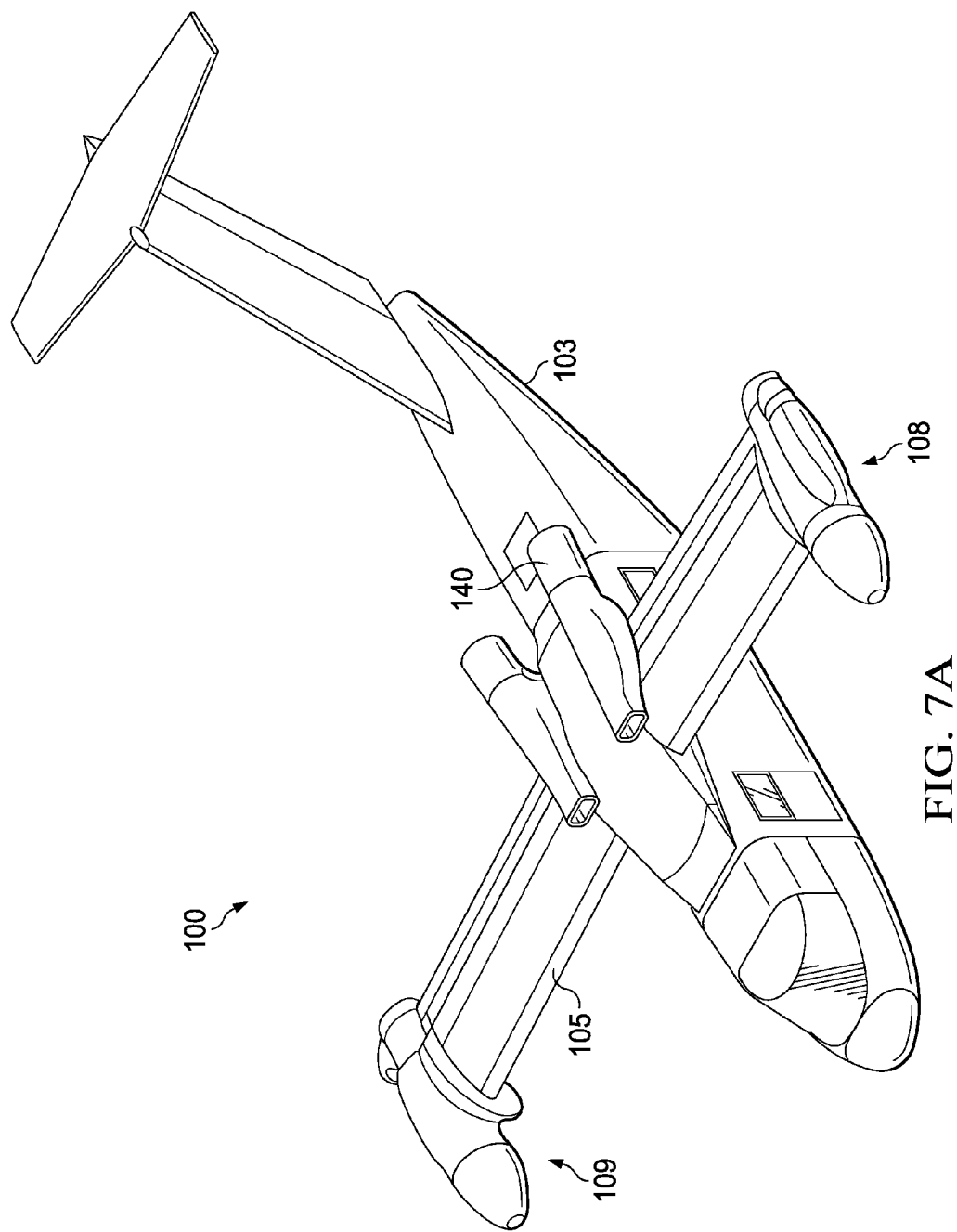
FIG. 7A is a perspective view of a rotatable wing arrangement according to an embodiment.

In an embodiment as shown in FIG. 7A, the wing member 105 forms a single component with the first rotor system 108 at a first tip of the wing member 105 and the second rotor system at the opposite tip of the wing member 105. One or more engine systems 140 can be disposed above the wing and adjacent the fuselage 103. A drive path extends between each rotor system and the one or more engine systems as described in more detail above. The wing member 105 is rotatably coupled to the fuselage 103. One or more selective engagement members can be used to fix the wing member 105 with respect to the fuselage 103 during operation. However, the engagement members can be disengaged to allow the wing member to rotate.

Figure 7B:
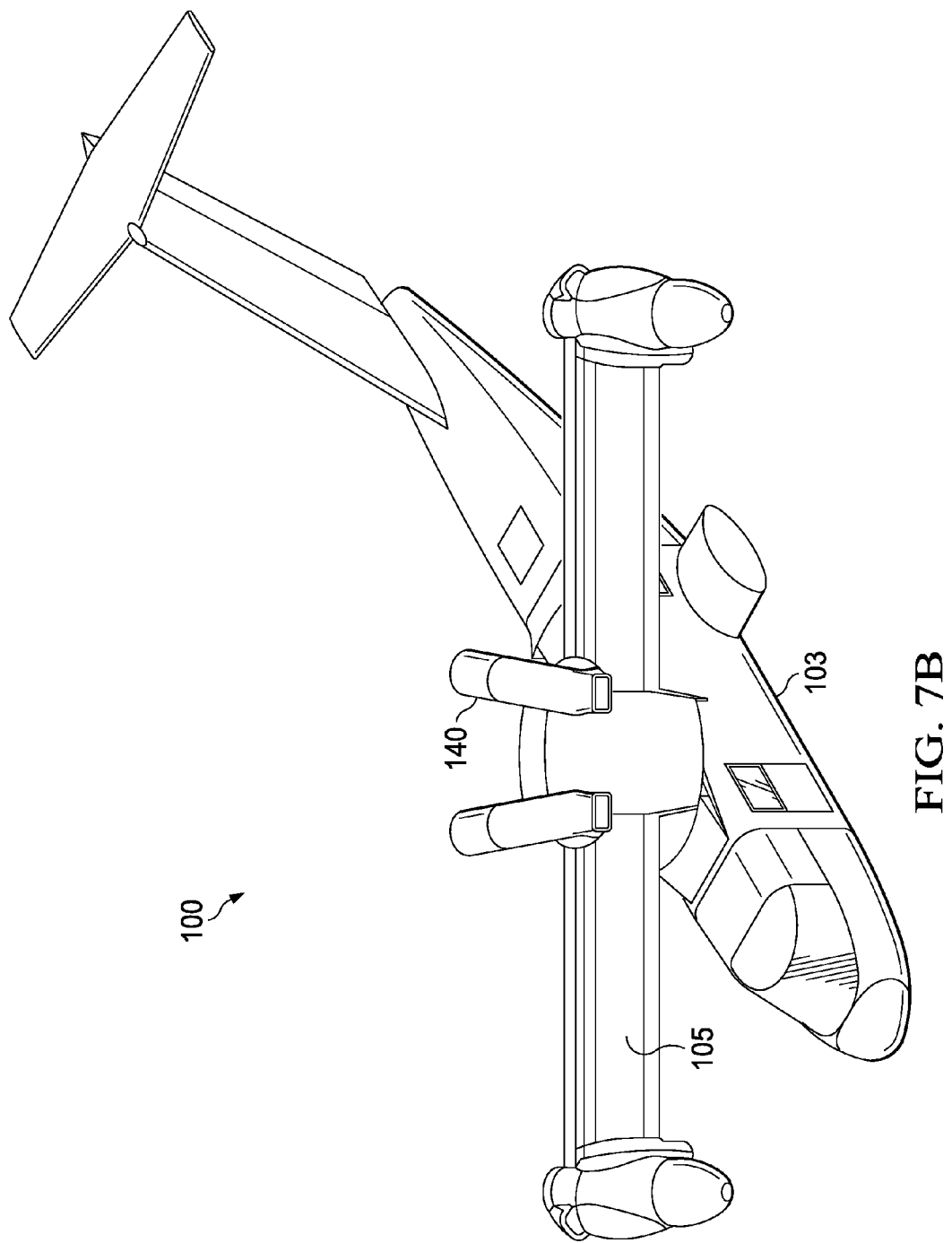
FIG. 7B is another perspective view of a rotatable wing arrangement according to an embodiment.

When it is desired to rotate the wing member 105, the wing member 105 can be disengaged from the fuselage 103. It will be appreciated that the rotor systems 108, 109 would not be active during the rotation process to prevent the rotor blades from contacting the fuselage. In some embodiments, the drive path can disengage from the engine and/or the prop-rotor pylon when the wing member 105 rotates relative to the fuselage 103 from the flight position. The wing member 105 can then be rotated relative to the fuselage 103 as shown in FIG. 7B. The rotor systems 108, 109 can be positioned in the airplane mode so that the rotor systems 108, 109 do not interfere with the rotation of the wing member 105.

Figure 7C:
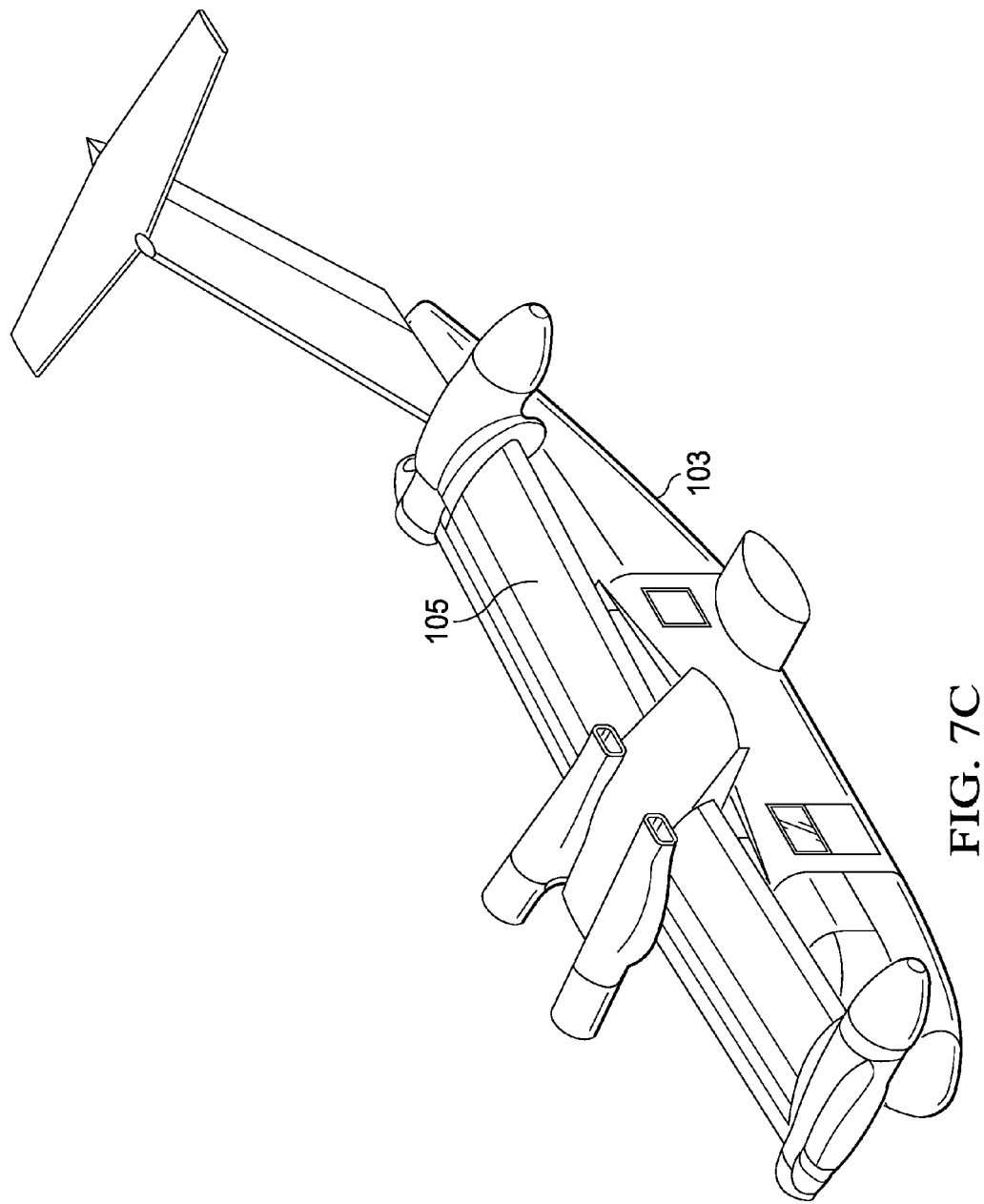
FIG. 7C is still another perspective view of a rotatable wing arrangement according to an embodiment.
Figure 7D:
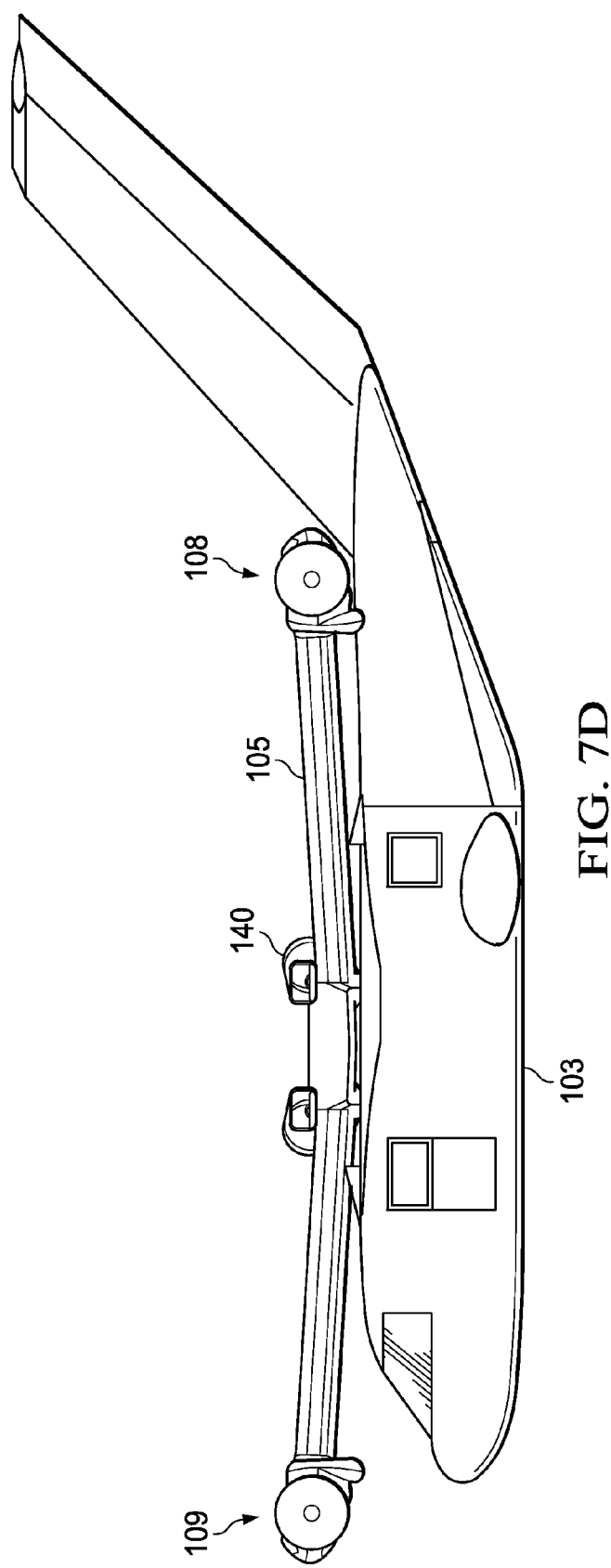
FIG. 7D is a side view of a rotatable wing arrangement according to an embodiment.

The wing member 105 can be rotated so that the length of the wing member (e.g., the axis extending from wingtip to wingtip) is approximately aligned with the longitudinal axis of the fuselage 103 as shown in FIG. 7C. The rotor blades are positioned during the rotation of the wing member 105 to avoid contact with the fuselage 103 or any other components of the aircraft 100. Once rotated approximately ninety degrees (e.g., a quarter turn), the wing member 105 can be fixed into position using one or more selective engagement members. The selective engagement members can serve to retain the wing member 105 in the rotated position during transport or other movement of the aircraft 100. The rotation of the wing member 105 can be useful for storing the aircraft 100 in a reduced amount of space. The reverse process can be used to rotate the wing member 105 from the storage position to the operational position.

As described above, the configuration of first rotor system 108 allows the engine 145 to remain fixed on the wing member 105, while only prop-rotor pylon 119 rotates to allow aircraft 100 to fly in a helicopter mode, an airplane mode, and conversion mode. The first rotor system 108 is configured such that the engine 145 is located on the wing member 105 adjacent the fuselage 103 and mechanically coupled to the prop-rotor pylon 119 along a drive path extending through the wing member 105. Further, an interconnect drive shaft 167 is used to carry engine power between rotor systems 108, 109, which can provide a safety margin to protect against an engine failure. Furthermore, configuring the rotor system 108 with a fixed engine, instead of an engine that rotates, can result in a reduction in engine certification costs, complexity, and expense, as well as providing an increase in engine options and availabilities, thus contributing to aircraft cost reduction. Still further, the use of the drive path configurations described herein can provide for independent drive path connections to the prop-rotor gearbox from the engine and the interconnect drive shaft, providing a further safety factor against a single point of failure in the prop-rotor system. In addition, the use of an engine in a fixed position on the wing member 105 can allow the wing member to be rotatably coupled to the fuselage, allowing the wing member to be rotated for storage of the aircraft.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed:

1. A rotor system for tilt rotor aircraft, the rotor system comprising:
   an engine disposed at a first fixed position above a wing member, wherein the engine is disposed adjacent to and above a fuselage of the tilt rotor aircraft, wherein the wing member is rotatable coupled to the fuselage, and the wing member is configured to rotate relative to the fuselage and align a width of the wing member with a longitudinal axis of the fuselage; and
   a prop-rotor pylon mechanically coupled to the engine along a drive path extending through the wing member, wherein the prop-rotor pylon is configured to selectively rotate between a vertical position and a horizontal position, and wherein the prop-rotor pylon is coupled to a plurality of rotor blades.

2. The rotor system of claim 1, wherein the engine comprises an intake and an exhaust, and wherein the engine is oriented so that the exhaust is canted away from the fuselage.

3. The rotor system of claim 1, wherein the drive path comprises a drive shaft extending through the wing member, and wherein the drive shaft is coupled to the engine through an inboard gearbox.

4. The rotor system of claim 3, wherein the inboard gearbox comprises a spiral bevel gearset.

5. The rotor system of claim 3, wherein the drive shaft is coupled to the prop-rotor pylon through a gearbox, and wherein the prop-rotor pylon is configured to selectively rotate along an axis of the gearbox.

6. The rotor system of claim 1, wherein the prop-rotor pylon is rotatably coupled to the wing member by a spindle.

7. The rotor system of claim 1, further comprising an interconnect drive shaft mechanically coupled to the engine, wherein the interconnect drive shaft is mechanically coupled to a second prop-rotor pylon.

8. The tilt rotor system of claim 1, further comprising a conversion actuator coupled to the wing member at a first point and to the prop-rotor pylon at a second point, wherein the conversion actuator is configured to selectively rotate the prop-rotor pylon between the vertical position and the horizontal position.

9. The rotor system of claim 1, wherein the plurality of ribs extend aft of a trailing edge of the wing member.

10. The rotor system of claim 1, further comprising a torque box formed by a plurality of ribs in the wing member, wherein the engine is mounted to the wing member using the torque box.

11. The rotor system of claim 10, further comprising a plurality of cross members extending between the plurality of ribs.

12. The rotor system of claim 10, wherein the plurality of ribs comprises two ribs extending between an aft spar and aft cove spar under the engine.

13. The rotor system of claim 10, further comprising a plurality of links coupling the engine at a mid-mount location to the torque box.

14. The rotor system of claim 10, further comprising a torque tube coupling the engine to a gearbox coupled to an aft spar.

15. A tilt rotor aircraft comprising:
   a fuselage;
   a wing member rotatably coupled to the fuselage, wherein the wing member is configured to rotate relative to the fuselage and align a width of the wing member with a longitudinal axis of the fuselage;
   an engine disposed at a first fixed position above the wing member, wherein the engine is disposed adjacent to and above the fuselage; and
   a prop-rotor pylon mechanically coupled to the engine along a drive path, wherein the prop-rotor pylon is configured to selectively rotate between a vertical position and a horizontal position.

16. The tilt rotor aircraft of claim 15, wherein the prop-rotor pylon is rotatably coupled to the wing member by a spindle.

17. The tilt rotor aircraft of claim 15, wherein the drive path is configured to disengage from the engine or the prop-rotor pylon when the wing member rotates relative to the fuselage.

18. The tilt rotor aircraft of claim 15, further comprising a conversion actuator coupled to the wing member at a first point and to the prop-rotor pylon at a second point, wherein the conversion actuator is configured to selectively rotate the prop-rotor pylon between the vertical position and the horizontal position.

19. The tilt rotor aircraft of claim 15, wherein the plurality of ribs extend aft of a trailing edge of the wing member.

20. The tilt rotor aircraft of claim 15, further comprising a torque box formed by a plurality of ribs in the wing member, wherein the engine is mounted to the wing member using the torque box.

21. A tilt rotor aircraft comprising:
a fuselage;
a wing member coupled to the fuselage, wherein the wing member is configured to rotate relative to the fuselage and align a width of the wing member with a longitudinal axis of the fuselage;
a plurality of engines located at fixed positions above the wing member, wherein each of the engines of the plurality of engines is disposed adjacent to and above the fuselage;
a plurality of prop-rotor pylons rotatably coupled to the wing member, wherein each prop-rotor pylon is configured to selectively rotate between a vertical position and a horizontal position, and wherein each of the prop-rotor pylons is mechanically coupled to at least one of the plurality of engines; and
a plurality of torque boxes, each torque box formed by a plurality of ribs in the wing member, wherein each engine is mounted to the wing member by a respective torque box.

22. The tilt rotor aircraft of claim 21, wherein each engine of the plurality of engines is mechanically coupled to each prop-rotor pylon of the plurality of prop-rotor pylons.

23. The tilt rotor aircraft of claim 21, further comprising an interconnect drive shaft mechanically coupling the plurality of engines.

24. The tilt rotor aircraft of claim 21, further comprising a conversion actuator coupled to the wing member at a first point and to the prop-rotor pylon at a second point, wherein the conversion actuator is configured to selectively rotate the prop-rotor pylon between the vertical position and the horizontal position.

25. The tilt rotor aircraft of claim 21, wherein, for each torque box, the plurality of ribs extend aft of a trailing edge of the wing member.

* * * * *